UNITED STATES PATENT OFFICE.

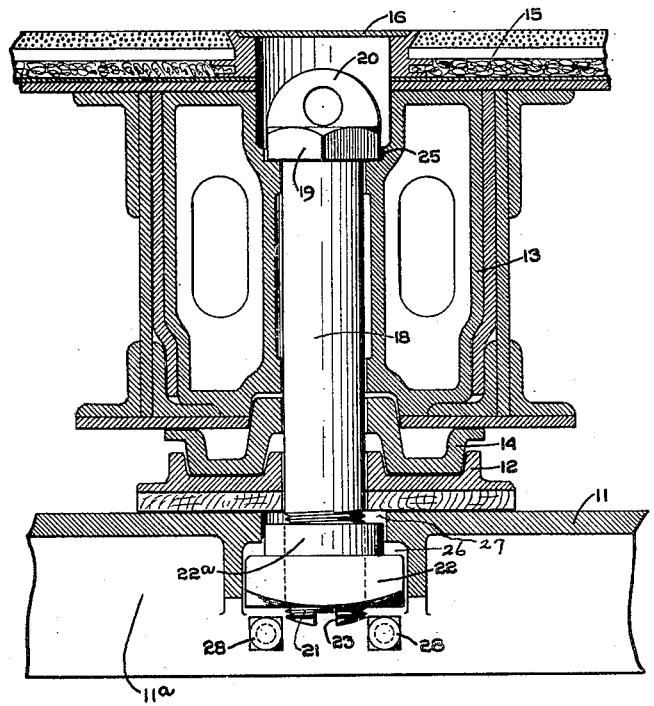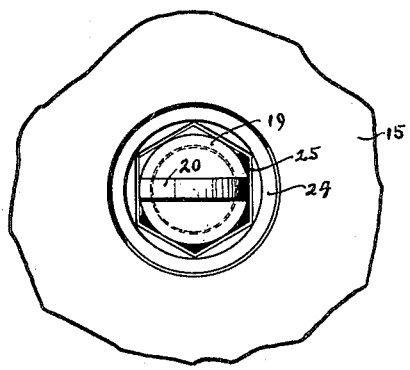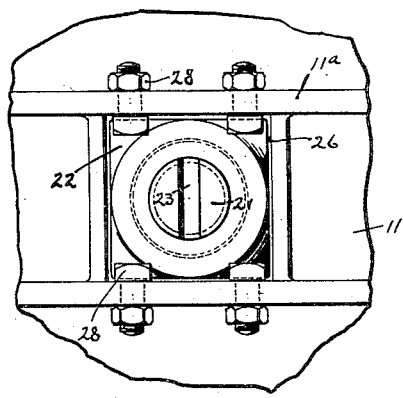

MILTON E. SHAVER, OF CHICAGO, ILLINOIS, ASSIGNOR TO THE PULLMAN COMPANY, OF CHICAGO, ILLINOIS, A CORPORATION OF ILLINOIS.

CENTER-PIN TRUCK CONNECTION.

1,402,972.   Specification of Letters Patent.   Patented Jan. 10, 1922.

Application filed March 31, 1920. Serial No. 370,284.

*To all whom it may concern:*

Be it known that I, MILTON E. SHAVER, a citizen of the United States, residing at Chicago, in the county of Cook and State of Illinois, have invented certain new and useful Improvements in Center-Pin Truck Connections, of which the following is a specification.

In practice, it is usual to connect the bolsters and trucks of cars by means of a center-pin which forms a pivot about which a limited amount of angular movement is permitted to facilitate the rounding of curves and the like, this angular movement of the truck about its pivot being limited by check chains connecting the sides of the truck with the car body. This center-pin has not ordinarily been depended upon to resist in any substantial degree shearing or bending strains resulting from collision and consequently it has been of small diameter. Where trains are in collision, the frame work of the cars is of sufficient strength to sustain the longitudinal stresses without yielding, but there is often manifest a tendency for the cars to override each other or "telescope." Various expedients have been devised in the way of car reenforcements to prevent this telescoping and to resist the effects thereof. One proposal has been to secure the trucks to the bolsters in such manner as to prevent their disassociation and thus interpose the trucks as an additional obstacle against the overriding of one car by another.

It has been proposed to constitute of the center-pin a locking connection between the bolster and truck by providing a key or nut to prevent the pin from leaving its socket, and also to increase the diameter of the pin to resist shearing and bending strains. This presents difficulties in the way of the inserting and removal of the center-pin, the positioning of the nut or key, and the tendency of these parts to become rusted or otherwise made difficult of separation.

It has been proposed to use a composite or sectional pin having integral head parts which could be placed piecemeal into the socket and then wedged apart with the head portions engaging the bolster and truck to prevent removal until the wedge is withdrawn. Such a pin, while complicated, is also lacking in strength commensurate with the weight of metal due to its sectional character.

The primary object of the present invention is the employment as a center-pin of a heavy bolt and nut of standard construction and to lock the bolster and truck together by means of the same in a most convenient manner, to the end that the nut and bolt will be prevented from disassociation and at the same time the rusting of the nut on the bolt will be effectually precluded.

In order that the invention may be readily understood in its application, an embodiment of the same is set forth by way of exemplification in the accompanying drawing and in the following detailed description based thereon.

In the drawing—

Fig. 1 is a vertical sectional view through the central portion of the bolster and truck showing the center-pin assembled therewith;

Fig. 2 is a fragmentary top plan, and

Fig. 3 is a similar bottom plan.

In the drawing the truck casting is represented generally at 11, the truck center plate at 12, the bolster at 13 and the bolster center plate at 14 rotatably positioned within the truck center plate 12; while the car floor construction is indicated at 15 as having an opening covered by the floor plate 16 in vertical alignment with a bore extending vertically through the bolster, the truck and the two center plates. Within this bore or socket is disposed the center pin 18 having a polygonal head 19 with an apertured ear 20 and a threaded lower end 21 engaged by the hexagonal nut 22. This center pin or bolt 18 may also be provided at its lower end with a kerf 23 for engagement by a suitable tool to effect its turning from below if desired.

The bore or socket has an upper enlarged portion forming a chamber 24 which may be circular or polygonal and the interior diameter of which is sufficiently great to receive and to permit the rotation therein of the polygonal head of the bolt. The lower portion of this chamber for a depth of one-half inch or so is reduced in diameter at 25 and is polygonal in shape to receive and to form a seat for the polygonal head of the bolt in such manner as to prevent rotation of the bolt relative to the bolster when seated as shown.

Similarly, as viewed from below, the socket in the truck casting is enlarged to form a chamber 26 which is preferably polygonal, and is of a sufficient size to accommodate the polygonal nut 22. In the upper portion, this chamber is reduced at 27 to receive and seat the reduced portion 22ª of the nut, whereby in the position shown, the nut is interlocked with the truck casting to prevent relative angular movement.

The flanged portion 11ª of the truck casting is provided with holes for the reception of bolts 28 underlying the nut 22 in order to form a lower abutment to prevent the dropping of the nut from the chamber 26 when freed from the bolt.

Assuming the bolster and truck are assembled by means of the center-pin in the relation shown in the drawing, in order to disassemble them, the center-pin is lifted by means of an operating tool engaging within the aperture at its upper end until its polygonal head is clear of the polygonal seat 25, the play between the upper edge of the nut and the upper wall of the recess below permitting of this lifting movement. Thereupon, the pin is rotated contra-clockwise, gradually retracting the same from threaded engagement with the nut which is held against rotation by the polygonal recess 26. This continues until the bolt leaves the nut which latter is retained within the chamber or recess 26 and prevented from dropping downward by the bolts or other abutments 28. The lifting of the center-pin or bolt from its socket uncouples the bolster from the truck, permitting the bolster and truck center plates to be disengaged.

If now it is desired to reassemble the parts, a center-pin or bolt 18 is dropped from above into the socket engaging with its lower end within the threaded opening of the nut held in the chamber 26. The bolt is rotated clockwise, causing its threaded end to progressibly enter the nut, the bolt in the meantime being held in an elevated position with its lower portion above its polygonal seat 25 until the upper edge of the nut contacts with the upper walls of the chambers 26 and 27 when the polygonal head of the nut will no longer clear the polygonal recess 25; whereupon the bolt is released and permitted to drop with its polygonal head seated in the polygonal recess 25, the nut dropping at the same time a distance corresponding to the depth of the recess 25 and designated by the position illustrated in the drawing with that amount of space separating the nut from the upper wall of the recesses 26 and 27.

It will be observed that by the polygonal recesses the bolt head is interlocked with the bolster and the nut is interlocked with the truck. The nut cannot become disassociated from the bolt except by the turning of the latter while held in an elevated position with its head free from its seat. Consequently there can be no accidental dislodgment of the nut.

Rusting of the nut on the bolt and the preventing thereby of ready disassociation, is precluded by the fact that in operation of the car, there is a constant relative angular movement between the truck and its bolster within a range limited by the check chains and due to curves and track inequalities. As the bolt is held rigid with the bolster and the nut is compelled to move with the truck, there ensues an intermittent slight angular movement of the nut on the bolt not sufficient to cause appreciable wear but enough to prevent the nut becoming set by rust.

It is thus rendered practicable to use a center-pin bolt of sufficiently heavy cross section to resist shearing and bending strains, in connection with a nut to resist tension strains and to prevent the bolt leaving its socket, with provision for convenient insertion and removal safe guarded against the bolt and nut becoming relatively anchored together by rust.

I claim:

1. In a center-pin connection for trucks, the combination with the bolster and truck, of a pivot bolt transfixing the two, a nut on the bolt, the bolt and nut respectively fixed relative to the bolster and the truck, and means for removing said bolt without detaching any parts of the bolster or truck.

2. In a center-pin connection for trucks, the combination with a bolster and truck having aligned axial apertures forming a socket, of a pivot bolt disposed in said socket, a nut on the bolt, the bolt head and nut being polygonal in shape and seated in polygonal recesses of the bolster and truck whereby to prevent turning of the bolt and nut within their recesses and to insure a turning of one relative to the other as the truck swings about the bolt as a pivot, and means for removing said bolt without detaching any parts of the bolster or truck.

3. In a center-pin connection for trucks, a bolster and a truck having aligned axial apertures forming a socket, the socket enlarged at its upper and lower ends to provide recesses polygonal in plan, in combination with a pivot bolt having a polygonal head, a polygonal nut, the bolt disposed within the socket with its head and the nut seated in the polygonal recesses of the bolster and truck whereby to prevent turning of the bolt and nut within their recesses and to insure a turning of one relative to the other as the truck swings on the bolt as a pivot, and means for removing said bolt without detaching any parts of the bolster or truck.

4. In a center-pin connection for trucks, a bolster and a truck having aligned axial apertures forming a socket, the socket enlarged at its upper and lower ends to provide recesses polygonal in plan, the recess in the lower end of the socket having a depth substantially greater than the recess in the upper socket portion, in combination with a pivot bolt having a polygonal head and a polygonal nut, the bolt disposed within the socket with its head and the nut seated in the polygonal recesses of the bolster and truck whereby to prevent turning of the bolt and nut within their recesses and to insure a turning of one relative to the other as the truck swings the bolt as a pivot.

5. In a center-pin connection for trucks, the combination with the bolster and truck, of a pivot bolt transfixing the two, a nut on the bolt, the bolt and nut respectively fixed relative to the bolster and the truck, and means accessible from below the truck without removal of any attached parts thereof for making inoperative the non-rotatable relation of the bolt to the bolster and removing the former.

6. In a center-pin connection for trucks, the combination with the bolster and truck, of a pivot bolt transfixing the two, a nut on the bolt, the bolt and nut respectively fixed relative to the bolster and the truck, and means accessible from above the bolster without removal of any attached parts thereof for making inoperative the non-rotatable relation of the bolt to the bolster and removing the former.

7. In a center-pin connection for trucks, the combination with the bolster and truck, of a pivot bolt transfixing the two, and a nut on the bolt, the bolt and nut respectively fixed relative to the bolster and the truck, said bolt being held in its non-rotatable relation to the bolster by its own weight, and means accessible from below the truck without removal of any attached parts thereof for raising the bolt out of its non-rotatable position and thereupon unscrewing the same from its end.

8. In a center-pin connection for trucks, the combination with the bolster and truck, of a pivot bolt transfixing the two, and a nut on the bolt, the bolt and nut respectively fixed relative to the bolster and the truck, said bolt being held in its non-rotatable relation to the bolster by its own weight, and means accessible from above the bolster without removal of any attached parts thereof for raising the bolt out of its non-rotatable position and thereupon unscrewing the same from its nut.

9. In a center-pin connection for trucks, a bolster and a truck having aligned axial apertures forming a socket open at both ends, the socket enlarged at its upper and lower ends to provide recesses polygonal in plan, in combination with a pivot bolt having a polygonal head, and a polygonal nut, the bolt disposed within the socket with its head and the nut seated in the polygonal recesses of the bolster and truck whereby to prevent turning of the bolt and nut within their recesses and to insure a turning of one relative to the other as the truck swings on the bolt as a pivot.

10. In a center-pin connection for trucks, a bolster and a truck having aligned axial apertures forming a socket, the socket enlarged at its upper and lower ends to provide recesses polygonal in plan, in combination with a pivot bolt having a polygonal head, and a polygonal nut, the bolt disposed within the socket with its head and the nut seated in the polygonal recesses of the bolster and truck whereby to prevent turning of the bolt and nut within their recesses and to insure a turning of one relative to the other as the truck swings on the bolt as a pivot, the distance between the bolt head and nut being greater than the distance separating the bottoms of the recesses whereby to permit axial movement of the bolt and nut to unseat the bolt head and allow rotation of the bolt relative to the nut in disassembling.

11. In a center-pin connection for trucks, the combination with a bolster and truck, of a pivot bolt transfixing the two, a nut on the bolt, locking means for normally preventing greater rotation between the bolt and nut than between the bolster and truck, and means for removing the bolt independently of the locking means.

12. In a center-pin connection for trucks, the combination with a bolster and truck, of a pivot bolt transfixing the two, a nut on the bolt, locking means for normally preventing greater rotation between the bolt and nut than between the bolster and truck, and means for removing the nut from the bolt without removal of the locking means.

In testimony whereof I have hereunto subscribed my name in the presence of two subscribing witnesses.

MILTON E. SHAVER.

Witnesses:
 GEO. HRICOVSKY, Jr.,
 RICHARD HAEKSTRA.